Patented June 19, 1928.

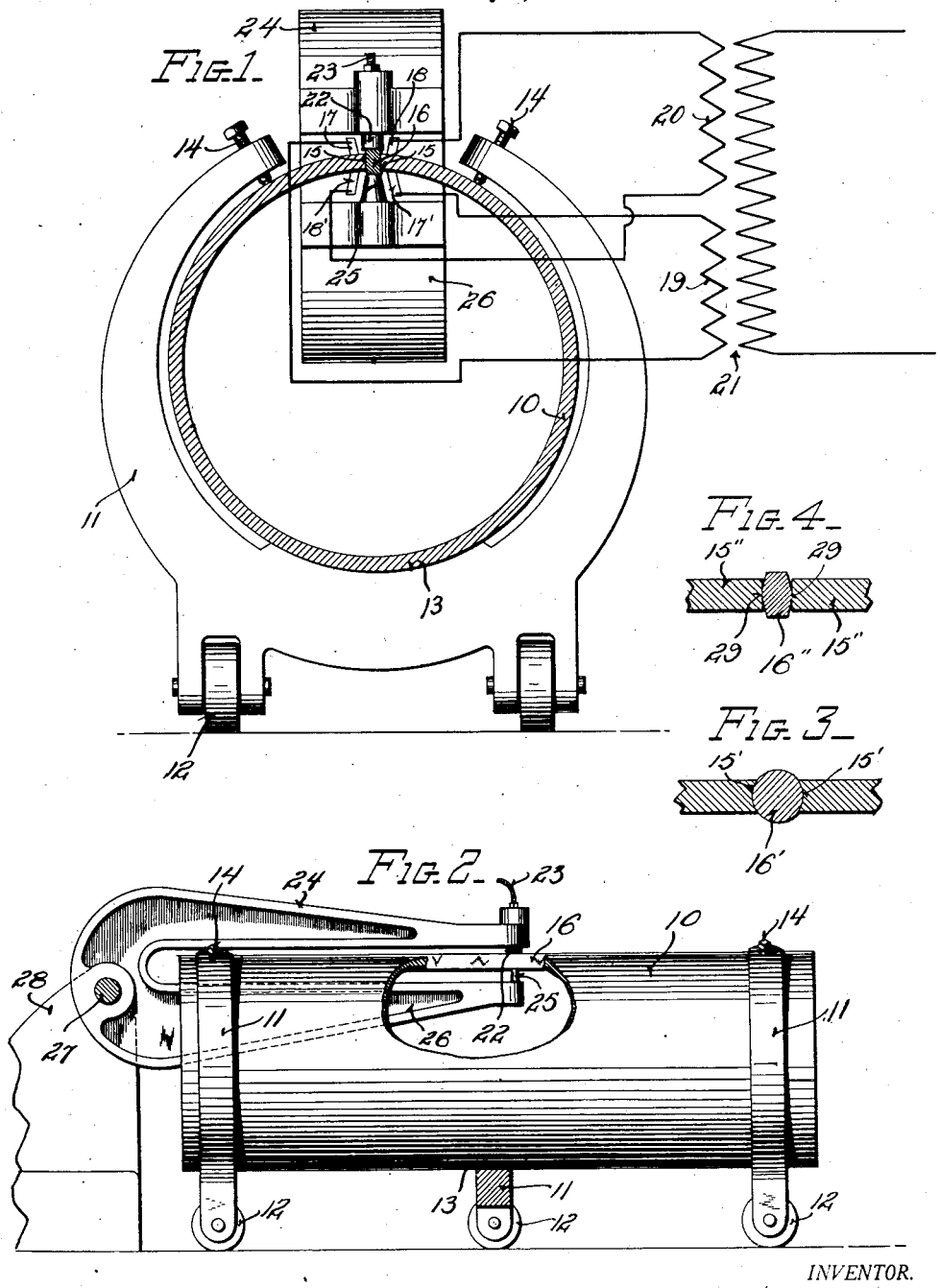

1,674,109

UNITED STATES PATENT OFFICE.

BENJAMIN GROB, OF WEST ALLIS, WISCONSIN.

METHOD OF ELECTRIC WELDING.

Application filed May 6, 1927. Serial No. 189,240.

This invention relates to the art of electric welding and particularly to the butt welding of heavy plates, heavy pipe sections and the like.

Arc welding processes are now quite generally applied to the joining of heavy work of this character due largely to the hitherto insurmountable difficulties involved in attempting to effect the pressures required for the production of a sound joint by resistance welding methods heretofore practiced. The arc welding process is not entirely satisfactory however on account of the excessive temperatures involved which cause a breaking down of the metal structure and a consequent impairment of the completed joint.

Nevertheless the arc welding process is still used practically exclusively for joining the abutting edges of heavy plates and heavy pipe seams in spite of numerous efforts heretofore made to overcome the difficulties incident to the carrying out of resistance welding processes heretofore known.

One object of the present invention is the provision of an improved method of resistance welding which may be readily and satisfactorily applied to the butt welding of heavy plates, heavy pipe sections and heavy pipe seams.

Other objects and advantages will appear from the following description of an application of my improved method to the electric welding of the longitudinal seams of heavy pipe sections. The specific method described however should be considered as an exemplification of the present invention the scope of which is determined by the appended claims and the state of the prior art.

In the drawings:

Figure 1 is a diagrammatic view in end elevation of apparatus that may be used to carry out my improved process, with the work shown in section.

Fig. 2 is a side elevation on a somewhat smaller scale.

Fig. 3 is a detail, in section, of a modified form of metal fillet or strip employed in carrying out my improved process.

Fig. 4 is a similar view of a further modified form of metal fillet employed.

For purposes of illustration and explanation my improved method will be described as applied to the welding of a longitudinal seam in a heavy pipe section, although it is applicable with like advantage to the butt welding of peripheral seams in joining heavy pipe sections and in butt welding the edges of heavy plates which may be flat or otherwise. In carrying out my method I firmly clamp the work in position with the edges slightly spaced and in substantial parallelism. The work shown in the drawings is a heavy pipe section 10, approximately eight feet in diameter and twenty four feet long with a wall thickness of approximately four inches. The pipe is shown supported in three carriages 11, each mounted on wheels 12, and each embracing the pipe section at spaced points thereon. The pipe rests upon an appropriate lower bearing 13 in each carriage, which bearing cooperates with appropriate clamp screws 14 to firmly hold the pipe in position with the edges 15 thereof in proper spaced relation. A metal fillet 16 is inserted between the opposed edges 15 and extended the full length thereof. The fillet, which may assume various forms, is of such width as to fit snugly between the edges 15 and, preferably of a depth somewhat greater than the thickness of the walls so as to project upwardly and downwardly beyond the surfaces thereof.

Heat is locally applied preferably uniformly to the fillet 16 and adjacent edges 15 to provide a good forging temperature while the heated portion of the fillet is simultaneously subjected to a squeezing pressure to cause the same to spread laterally against the opposed edges 15 to thereby produce a good welding pressure between it and the edges. This combined heating and squeezing action is applied progressively at successive localized points throughout the length of the seam thereby effecting an intimate union of the fillet with the edges of the work throughout.

In order to obtain a substantially uniform heating of the fillet 16 and edges 15 I pass an electric current from edge to edge of the work through the fillet. In the apparatus shown use is made of two pairs of electrodes 17—17' and 18—18', each pair connected to the opposite terminals of separate secondary windings 19 and 20 of an appropriate transformer 21, and applied to the work in such manner as to cause a flow of electricity along diagonal intersecting paths from both edges 15 through the fillet 16. Thus, as indicated in Figure 1, electrodes 17 and 18 are applied to the external surface of the pipe 10 adjacent opposite sides of the fillet 16 and electrodes 17' and 18' are applied to the internal surface of the pipe adjacent opposite sides of the fillet so that current is caused to flow through the fillet between electrodes 17—17' and through the fillet between electrodes 18'—18'.

The squeezing pressure is preferably applied to the fillet in a direction transversely of the current by any appropriate means such as a hydraulically operated ram 22 supplied with operating fluid from an appropriate pressure source through a hose 23 or the like. The ram shown is carried by a jaw 24 and reacts against an anvil 25 mounted upon a second jaw 26. The two jaws are rigidly connected and supported to rock as a unit upon a pivot 27 carried by an appropriate upright 28. During the process of welding the pipe 10 is moved lengthwise with respect to the electrodes and ram, and the ram is intermittently operated to squeeze the fillet at successive localized points along the length thereof, as the fillet 16 and edges 15 of the pipe are heated by the flow of current through the electrodes.

The fillet 16 shown in Figures 1 and 2 is of rectangular cross-section and the edges 15 of the pipe are substantially flat and in full contact with the sides of the fillet. Other shapes however may be employed. In Figure 3, for instance, the fillet 16' is in the form of a round rod and the opposed edges 15' of the work are of concave form so as to make full contact with the sides of the fillet. Another form of fillet 16'' is shown in Figure 4. In this instance the fillet 16'' is shaped to provide substantially narrow longitudinal faces 29 for contact with the opposed edges 15'' of the work and transversely tapered in both directions from these intermediate faces. The use of this form of fillet insures a good initial contact between it and the edges 15'' the area of contact increasing as the fillet is deformed under the squeezing pressure and rise in temperature.

What I claim as new and desire to secure by Letters Patent is:—

1. The improved method of electric welding which consists in firmly securing the parts to be welded in closely spaced relation, inserting a metal fillet between and in contact therewith, applying heat to said fillet and parts at successive localized points by passing an electric current therethrough and applying a squeezing pressure to the successively heated portions of said fillet in a direction transverse to the current to spread the same and thereby effect a welding pressure between it and said parts.

2. The improved method of electric welding which consists in securing the parts to be welded in closely spaced relation, inserting a metal fillet between and in contact therewith, passing an electric current through said fillet from one of said parts to the other to heat the fillet and parts at successive localized points, and simultaneously squeezing the successively heated portions of said fillet to spread the same into welding contact with said parts.

3. The improved method of electric welding heavy plates and the like which consists in firmly securing the plates in position with their edges opposed and slightly spaced, inserting a metal fillet between and in contact with the opposed edges so as to project beyond the same, heating said edges and fillet at successive localized points by passing an electric current therethrough, and applying pressure to the opposite exposed sides of said fillet transversely of the current flow at the successively heated portions thereof to spread the same into welding contact with said edges.

4. The improved method of electric welding which consists in firmly securing the parts to be welded in position with their respective edges opposed and in spaced relation, inserting a metal fillet between said edges and in contact therewith within a portion only of the depth thereof, heating said fillet and edges at successive localized points by passing an electric current therethrough from one of said parts to the other, and simultaneously spreading the successively heated portions of said fillet into welding contact with said edges.

5. An electric welding apparatus comprising clamping means for holding the parts to be welded in definite spaced relation, two diagonally disposed pairs of electrodes for contact with said parts, separate circuits for the electrodes of each pair, and means for applying a squeezing pressure to a metal fillet interposed between said edges to spread the same into welding contact with said edges during the passage of electricity therethrough.

6. The improved method of electric welding which consists in firmly securing the parts to be welded in closely spaced relation, inserting a metal fillet between and in contact therewith, passing an electric current from one of said parts through said fillet to the other of said parts to heat the same, and applying pressure to said fillet in a direction transversely of the current to spread said fillet and thereby effect a welding pressure between it and said parts.

7. An electric welding apparatus comprising means for holding the parts to be welded in definite spaced relation with a fillet therebetween, means for passing a current of electricity from one of said parts through the fillet to said other part, and means for applying a squeezing pressure to said fillet in a direction transversely of the current to spread said fillet and thereby effect a welding pressure between it and said parts.

In witness whereof, I hereunto subscribe my name this 3rd day of May, 1927.

BENJAMIN GROB.